United States Patent [19]

Hague et al.

[11] Patent Number: 4,862,633
[45] Date of Patent: Sep. 5, 1989

[54] GANGION FOR LONGLINE FISHING GEAR

[76] Inventors: Barbara E. Hague; Douglas G. Sparrowhawk, both of Site 21, Box 28, R.R. #1, Lantzville, British Columbia, Canada, V0R 2H0

[21] Appl. No.: 268,769

[22] Filed: Nov. 8, 1988

[30] Foreign Application Priority Data

Nov. 24, 1987 [CA] Canada .................................. 552643

[51] Int. Cl.⁴ ............................................ A01K 79/00
[52] U.S. Cl. ................................................... 43/44.84
[58] Field of Search ....................................... 43/44.84

[56] References Cited

U.S. PATENT DOCUMENTS

| | | | |
|---|---|---|---|
| 578,762 | 3/1897 | McMahon | 43/44.84 |
| 3,435,552 | 4/1969 | Caldwell | 43/44.84 |
| 4,524,535 | 6/1985 | Bates | 43/44.84 |

FOREIGN PATENT DOCUMENTS 8358 of 1911 United Kingdom ............... 43/44.84

Primary Examiner—M. Jordan
Attorney, Agent, or Firm—Christie, Parker & Hale

[57] ABSTRACT

A novel gangion for longline fishing gear is disclosed. Prior gangions consisted of a length of braided nylon cord or twine. The present invention provides a gangion consisting of a reduced length of braided nylon cord attached to the gangion snap. The hook is connected to a length of heavy monofilament nylon line. The nylon monofilament is connected in turn by a swivel to the braided nylon. The problem with twisting and tangling of the gangion is thereby overcome.

7 Claims, 3 Drawing Sheets

GANGION FOR LONGLINE FISHING GEAR

BACKGROUND OF THE INVENTION

The invention relates to the field of longline fishing gear and more particularly to an improved gangion for longline fishing gear.

Longline fishing is a method of fishing often used to fish for bottom feeders such as halibut, rock cod, ling cod, black cod or dogfish. The halibut is a large, edible bottom-feeding flatfish which often reaches hundreds of pounds in weight. It is prized by commercial fishermen because of its valuable meat and large size. The season on the west coast of North America for commercial fishing of the halibut is very short and therefore the commercial fishermen must be fast and efficient in their catch.

While halibut may be fished using drag nets, the longline method of fishing is preferred. In this way the fish is still alive when pulled into the boat and is not damaged as may be the case with drag net fishing. According to the prior art method of longline fishing, the fisherman will set out lines in an area where the depth is between 200 and 600 feet. The boat lays out a series of ground lines connected to a flag and marker buoy by a buoy line. Each groundline or "skate" is about 600 to 1,000 feet long and a typical boat will lay out 30 or 40 groundlines at a time. Each groundline has attached to it 60 to 100 gangions which are three-foot lengths of No. 72 thread braided nylon. An anchor holds the end of groundline in place. A hook is secured to the end of each gangion and each hook is baited. The groundline is allowed to "soak" on the bottom for a number of hours until the skipper of the boat considers it appropriate to pull in the groundline and remove the hooked fish.

The groundline is typically 9/32nd-inch (0.6 centimeter) treated nylon line to which the gangion may be attached directly by tying or by the use of a 5-inch (12.7 centimeter) gangion snap, which is a metal snap which allows the gangion to be rapidly attached and removed from the groundline. The so-called "circle" hook is currently preferred for the hook due to its improved holding ability.

The problem with the current longline fishing gear is that the braided nylon gangion becomes extremely twisted and tangled when it is drawn back into the boat due to the action of the hooked fish. The gangion is quite stiff and each gangion must be neatly stored on the boat for the next baiting of the line. Currently it is necessary for the crew member to remove the gangion as the line is being drawn back into the boat and take some time to untangle it. As a result, valuable fishing time is lost.

A number of modifications had been attempted to the gangion to overcome this problem. Monofilament nyulon has been substituted for the stiffer braided nylon, but such monofilament is slippery and difficult to see by the crew member. Because it is slippery when wet, and the crew member is using large rubber gloves to removed the hooked fish, it is difficult for the crew member to handle a monofilament gangion. Also, in bad light, as the line is being drawn back onto the boat, the crew member cannot see the individual gangion and may get hooked accidentally. It is also difficult for a crew member to remove the pure monofilament gangions from the bait-box in poor light. Placing a swivel between the gangion line and the hook or between the gangion line and the snap has also been attempted. In the former case the hook does not set properly. In the latter case the swivel is generally useless as the line wraps around the groundline.

SUMMARY OF THE INVENTION

The present invention provides an improved gangion for longline fishing which reduces tangling of the gangion and increases the effectiveness of the gear for fishing. It comprises a gangion formed of a length of braided nylon and a length of monofilament nylon. The braided nylon forms approximately two-thirds of the length of the gangion and is attached at one end to the gangion snap or the groundline. The other end of the braided nylon is attached to the monofilament line by a swivel connection. The hook is attached to the other end of the monofilament nylon.

BRIEF DESCRIPTION OF THE DRAWINGS

In drawings which illustrate a preferred embodiment of the invention.

DETAILED DESCRIPTION OF A PREFERRED EMBODIMENT OF THE INVENTION

Figure 1:
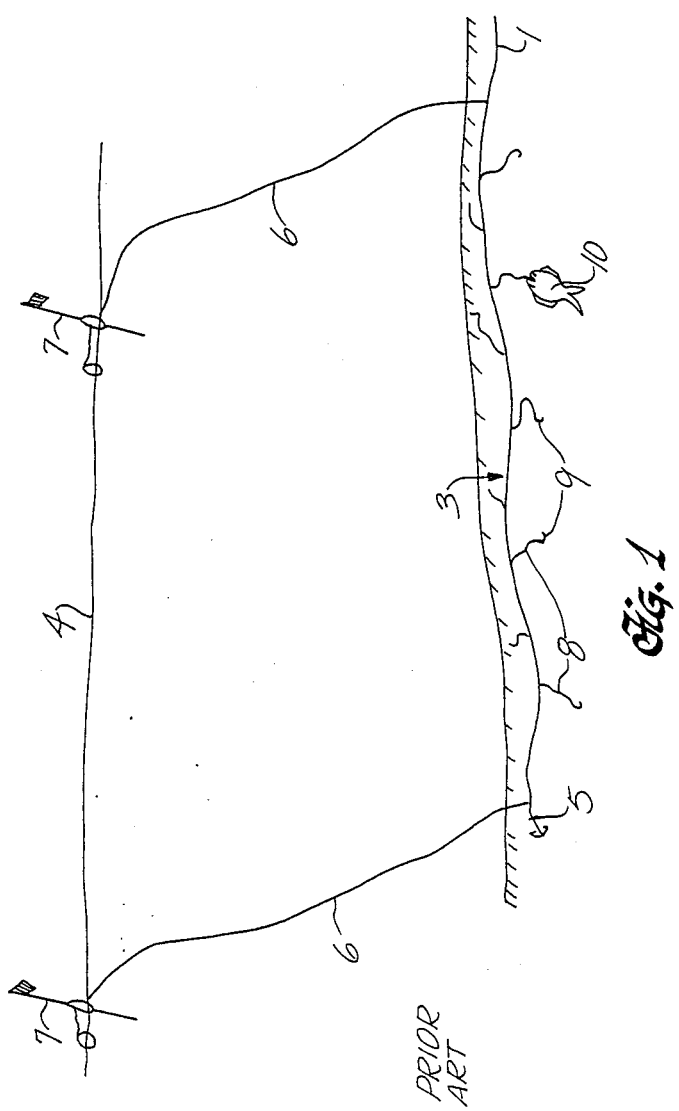
FIG. 1 is a schematic view of the prior art longline fishing system.

The prior art method of longline fishing is shown in FIG. 1. Generally, the fisherman will set out the lines in an area where the depth is between 200 and 600 feet. In FIG. 1 the ocean surface is designated by numeral 4 and the sea floor by numeral 3. The boat lays out a series of groundlines 1 connected to a flag and marker buoy 7 by a buoy line 6. Each groundline or "skate" is about 600 to 1,000 feet long and a typical boat will lay out 30 or 40 groundlines at a time. Each groundline has attached to it 60 to 100 gangions 8 which are in the prior art three-foot lengths of No. 72 thread braided nylon. An anchor 5 holds the groundline in place. The hook 9 is secured to the end of each gangion and each hook is baited. The groundline is allowed to "soak" on the bottom for a number of hours until the skipper of the boat considers it appropriate to pull in the groundline and remove the hooked fish.

The groundline is typically 9/32nd-inch (0.6 centimeter) treated nylon line to which the gangion may be attached directly by tying or by the use of a 5-inch (12.7 centimeter) gangion snap, which is a metal snap which allows the gangion to be rapidly attached and removed from the groundline. The so-called "circle" hook is currently preferred for the hook due to its improved holding ability. A hooked fish is shown as numeral 10 in FIG. 1.

Figure 2:
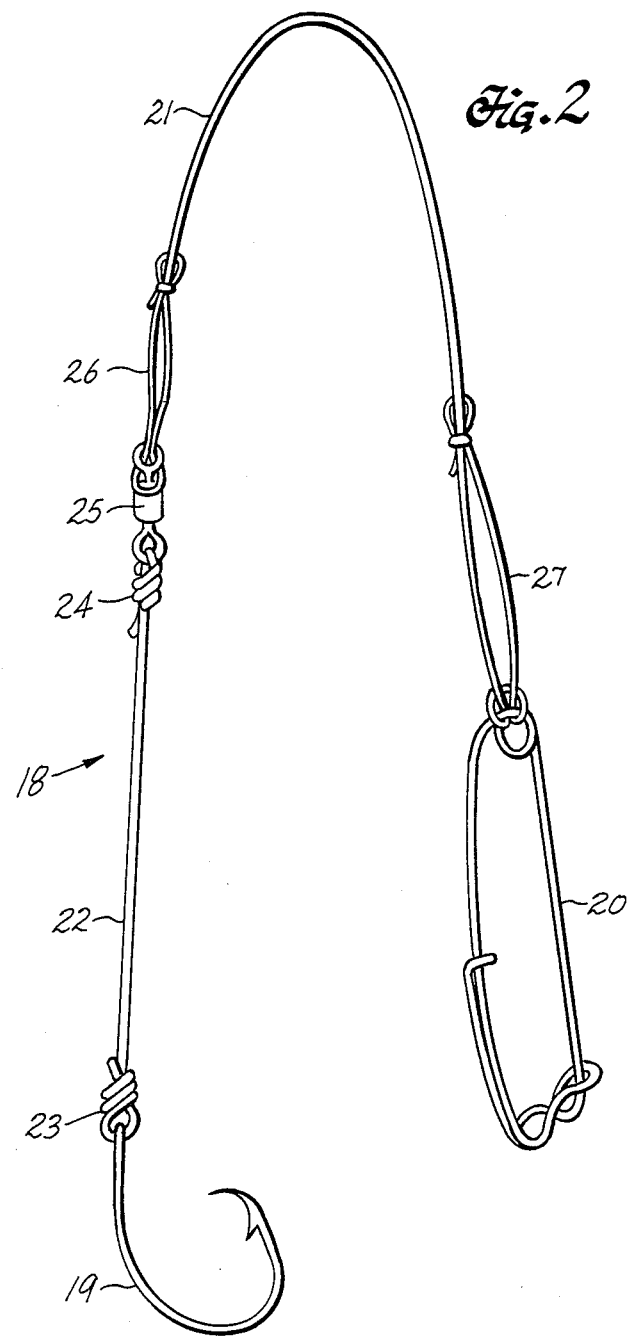
FIG. 2 is a plan view of the improved gangion of the invention.

FIG. 2 shows a gangion 18 having a circle hook 19 secured at one end and a gangion snap 20 at the other end. Snap 20 is used to connect the gangion to the groundline. The length of the line between the hook and the snap is about three feet typically. Two-thirds of that length is formed of a braided nylon cord or twine 21 which may be a 72-thread braided nylon as was used for the prior art gangion. The remaining one-third of the length of the gangion is comprised of a heavy monofilament nylon line 22. This will be a 200-pound test or greater monofilament such as that sold under the trade mark PERLON. The PERLON is tied through the eye of hook 19 at one end by knot 23. At the other end the PERLON is tied by knot 24 to a swivel 25. The swivel is in turn attached to a loop 26 of the braided nylon 21, and a further loop 27 is used to secure the snap 20.

It has been found that positioning the swivel onethird the length of the gangion from the hook maximizes the utility of the swivel in eliminating tangling. The use of the PERLON to connect the hook not only contributes to the elimination of tangling but has the added advantage of camouflaging the hook from the fish, as such monofilament is invisible under water. The effectiveness of the gear for catching fish is thereby improved. By retaining the braided nylon portion for the upper two-thirds of the length, the gangion can be readily handled by the deck hands when baiting and replacing the gangion, and further is readily visible to the deck hands in poor light.

Figure 3:
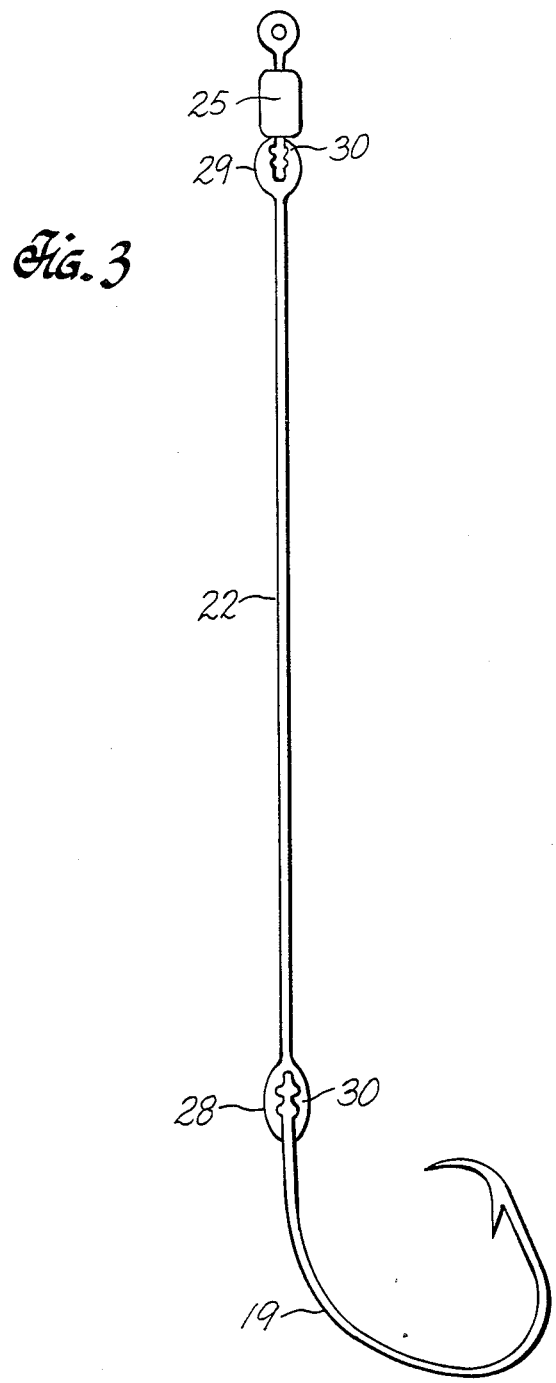
FIG. 3 is an alternative embodiment for the monofilament portion of the improved gangion.

An alternate embodiment of the manner of attaching the PERLON to the swivel and the hook is shown in FIG. 3. Rather than knotting the PERLON through an eye in the swivel 25 and an eye in the hook 19, the PERLON is molded directly and permanently around the end of the hook at 28 and around an extension of the swivel at 29. This method of permanently bonding the nylon monofilament to the metal parts avoids the need for tying a knot in the monofilament and allows a heavier monofilament line to be utilized. In order to allow the monofilament to grip the metal extension, the metal extensions on the hook and on the swivel are provided with projections 30 in a known manner.

Alternatively, rather than permanently bonding the monofilament to the metal end of the swivel and hook, fittings similar to those used to make hydraulic connections could be utilized. Such fittings have a male and female part which secures the two parts together when the male part is inserted into the female and does not allow the male part to be withdrawn.

It will be apparent to those skilled in the art that various adaptations and modification of the above-described invention are possible without departing from the spirit of the invention, the scope of which is defined in the appended claims.

The embodiments of the invention in which an exclusive property or privilege is claimed are defined as follows:

1. A gangion for longline fishing using groundlines, said gangion having one end adapted for attachment to a hook and the opposite end adapted for attachment to a groundline wherein said first end adapted for attachment to said hook consists of a length of transparent synthetic polymer fibre, wherein said second end of said gangion adapted for attachment to said groundline consists of a length of braided synthetic polymer fibre, and wherein said transparent length is connected to said braided length by a swivel.

2. The gangion of claim 1 wherein the length of said monofilament line is approximately one-half the length of said braided nylon line.

3. The gangion of claim 2 further comprising means attached to said second end of said gangion for removably attaching said gangion to said groundline.

4. The gangion of claim 3 wherein said monofilament length of line is permanently molded to one end of said swivel and at the other end to said hook.

5. The gangion of claim 1 wherein said transparent length is monofilament nylon.

6. The gangion of claim 2 wherein said transparent length is monofilament nylon.

7. The gangion of claim 1, 5 or 6 whrein said braided length is braided nylon.

* * * * *

UNITED STATES PATENT AND TRADEMARK OFFICE
CERTIFICATE OF CORRECTION

PATENT NO. : 4,862,633
DATED : September 5, 1989
INVENTOR(S) : B.E. Hague; D.G. Sparrowhawk It is certified that error appears in the above-identified patent and that said Letters Patent is hereby corrected as shown below:

In the Specification:

Column 1, lines 55,56, change "nyulon" to -- nylon --.
Column 1, line 59, change "removed" to -- remove --.

Column 2, line 40, change "which are in the prior art" to
          -- which, in the prior art, are --.

Column 3, line 5, change "onethird" to -- one-third --.

In the Claims

Column 4, line 34, change "whrein" to -- wherein --.

Signed and Sealed this

Twenty-sixth Day of February, 1991

Attest:

HARRY F. MANBECK, JR.

Attesting Officer    Commissioner of Patents and Trademarks